(12) United States Patent
Roske et al.

(10) Patent No.: US 8,757,305 B2
(45) Date of Patent: Jun. 24, 2014

(54) HYBRID DRIVE ARRANGEMENT

(75) Inventors: Michael Roske, Friedrichshafen (DE);
Wolfgang Grosspietsch, Schweinfurt (DE); Andreas Ratte, Dittelbrunn (DE); Alexander Bartha, Wurzburg (DE); Timo Wehlen, Friedrichshafen (DE); Steffen Matschas, Gochsheim (DE); Dieter Kraxner, Vaihingen an der Enz (DE); Martin Fuchtner, Stuttgart (DE); Henrik Schrage, Weinsberg (DE)

(73) Assignees: ZF Friedrichshafen AG, Friedrichshafen (DE); Dr. Ing. h.c.F. Porsche Aktiengesellschaft, Weissach (DE)

( * ) Notice: Subject to any disclaimer, the term of this patent is extended or adjusted under 35 U.S.C. 154(b) by 518 days.

(21) Appl. No.: 13/050,119

(22) Filed: Mar. 17, 2011

(65) Prior Publication Data
US 2011/0240384 A1 Oct. 6, 2011

(30) Foreign Application Priority Data
Mar. 30, 2010 (DE) .......................... 10 2010 003 442

(51) Int. Cl.
*B60K 6/42* (2007.10)
(52) U.S. Cl.
USPC ...................................................... 180/65.22
(58) Field of Classification Search
USPC ...................... 477/2, 5, 6, 8; 180/65.1–65.31; 903/902, 911
See application file for complete search history.

(56) References Cited

U.S. PATENT DOCUMENTS

| | | | |
|---|---|---|---|
| 5,829,566 A * | 11/1998 | Winks et al. ............... | 192/70.12 |
| 7,485,061 B2 | 2/2009 | Reisch et al. | |
| 7,815,026 B2 * | 10/2010 | Povirk et al. ................. | 192/3.26 |
| 8,146,726 B2 * | 4/2012 | McCutcheon et al. ..... | 192/70.28 |
| 8,267,208 B2 * | 9/2012 | Kleuker ..................... | 180/65.22 |
| 8,337,171 B2 | 12/2012 | Agner et al. | |
| 8,444,519 B2 * | 5/2013 | Borntraeger et al. ............. | 475/5 |
| 8,453,817 B2 | 6/2013 | Schrage | |
| 2003/0183474 A1 * | 10/2003 | Heidenreich et al. ........ | 192/70.2 |
| 2006/0000684 A1 * | 1/2006 | Agner et al. .................. | 192/48.8 |
| 2007/0205076 A1 * | 9/2007 | Takahashi et al. ............ | 192/108 |
| 2008/0023287 A1 * | 1/2008 | Thiede et al. ................ | 192/48.1 |
| 2011/0240384 A1 * | 10/2011 | Roske et al. ............... | 180/65.22 |
| 2011/0259698 A1 * | 10/2011 | Arnold et al. ................ | 192/48.1 |

FOREIGN PATENT DOCUMENTS

| | | |
|---|---|---|
| DE | 102005040771 A1 | 3/2007 |
| DE | 102007060165 A1 | 6/2009 |
| DE | 102009059944 A1 | 7/2010 |
| DE | 102009030135 A1 | 12/2010 |
| DE | 102009038344 A1 | 2/2011 |
| EP | 1916421 A2 | 4/2008 |
| WO | 2009074219 A2 | 6/2009 |

* cited by examiner

*Primary Examiner* — John Walters
*Assistant Examiner* — James Triggs
(74) *Attorney, Agent, or Firm* — Davis & Bujold, PLLC; Michael J. Bujold (57) ABSTRACT

A hybrid drive arrangement for a vehicle with an internal combustion engine for driving, under engine power, and at least one electric machine (1), for electric driving, and with a double-clutch transmission. The electric machine (1) can be separated from the internal combustion engine by at least one separator clutch (3), in the form of a wet-operating, hydraulically actuated disk clutch. The outer disk carrier (4) of the separator clutch (3) and the outer disk carriers (5, 5A) of the two double clutches, of the double-clutch transmission, are connected and mounted on the transmission housing (6).

16 Claims, 6 Drawing Sheets

HYBRID DRIVE ARRANGEMENT

This application claims priority from German patent application serial no. 10 2010 003 442.8 filed Mar. 30, 2010.

FIELD OF THE INVENTION

The present invention concerns a hybrid drive arrangement for a vehicle.

BACKGROUND OF THE INVENTION

From automotive technology, hybrid drive arrangements for vehicles with an internal combustion engine for driving under internal combustion engine power and with an electric machine for driving under electric power and with a transmission, are known. Particularly with parallel hybrid systems, a separator clutch is needed between the electric machine and the internal combustion engine so that the internal combustion engine can be uncoupled during electric driving. The separator clutch can be in the form of a dry or a wet disk clutch. In the case of hybrid modules with dry-running electric machines, a wet disk clutch, as the separator clutch, is made as a closed module. Because of this design, as an independent module with the need for additional mountings and seals for the rotating parts, the required structural fitting space is increased considerably. Furthermore, owing to the central pressure medium delivery, undesired drag torques are produced in the independent clutch, whereby the power loss is increased and the clutch is also heated.

SUMMARY OF THE INVENTION

Accordingly, the purpose of the present invention is to design a hybrid drive arrangement in such manner that it takes up as little space as possible and, in the disengaged condition of the separator clutch, the drag torques produced are as small as possible.

Thus a hybrid drive arrangement for a vehicle is proposed, with an internal combustion engine for driving under engine power and with at least one electric machine for electric driving, and with a double-clutch transmission, such that the electric machine or E-machine can be separated from the internal combustion engine by at least one separator clutch, preferably in the form of a wet, hydraulically actuated disk clutch. According to the invention, the outer disk carrier of the separator clutch and the outer disk carriers of the two disk clutches of the double-clutch transmission can be connected and mounted conjointly on the transmission housing.

By virtue of the integrated design of the separator clutch and the double clutch of the hybrid drive arrangement according to the invention, a short length and reduced weight are achieved thanks to the omission of seals and bearing elements and the connection points associated with them. With the hybrid drive arrangement proposed, owing to its design, the draining away of the cooling oil, for the separator clutch, is not impeded so that drag torques are at least reduced to a minimum. Furthermore, the function of the double clutch is also not influenced by cooling oil flowing back from the separator clutch.

A preferred embodiment variant can provide that the outer disk carrier of the separator clutch and the outer disk carrier of the disk clutches of the double clutch are made integrally, this component being mounted on both sides in the transmission housing. It is also possible for the outer disk carrier of the separator clutch and the outer disk carrier or torus of the double clutch to be coupled by at least one releasable connection, this releasable connection preferably being designed free from play. For example, the releasable connection can be made with a small diameter by a suitable shaft-hub joint or the like. Or, for example, with a larger diameter, the releasable connection could be made with the help of a flange joint or the like. In this way, the hybrid module of the hybrid drive arrangement, according to the invention, can be combined very simply with existing double clutches, so to speak, as an add-on solution.

To design the mounting of the electric machine in the proposed hybrid drive arrangement as simply as possible, it can be provided that the outer disk carrier of the separator clutch is connected to the rotor of the electric machine, as part of a related further development. In this way the mounting of the outer disk carrier combination can, at the same time, serve as the mounting of the electric machine.

For an indirect mounting of the inner disk carrier in the transmission housing, in another design feature of the invention, it can be provided that the inner disk carrier of the separator clutch is mounted in the axial and/or radial direction, for example, on both sides in the outer disk carrier combination. To transmit torque to the double-clutch transmission, the inner disk carriers of the double clutches are, in each case, coupled to the input shaft of the associated part-transmission of the double-clutch transmission.

To ensure a sufficient pressure medium or oil supply, for example for the separator clutch, in the hybrid drive arrangement, according to the invention, it can be provided that for the delivery of the pressure and cooling oil for actuating and cooling the separator clutch at least one bore or the like is made in one of the input shafts of the double-clutch transmission. It is also conceivable to choose some other type of pressure medium supply means.

To divide the quantity of pressure medium appropriately for the cooling and actuation, for example, an adjustable diaphragm, in the form of a flow-limiting valve or the like, can be provided. This divides the pressure medium flow available. Part of it is delivered to the piston space for actuating the separator clutch and to the disk packet for lubrication and cooling purposes, and the other part is delivered to the so-termed centrifugal force compensation space. The lubrication and cooling oil flows through a ring gap or the like with a small diameter into the inner disk carrier of the separator clutch and, for example, through further holes to the disk packet. Advantageously, in this way, the pump action of the disk packet due to the rotating clutch disks can be used to drive the cooling oil radially outward. Preferably, the linings of the clutch disks can have grooves or the like. For example, via bores or the like in the outer disk carrier, the lubricating and cooling oil flows back again into the transmission sump without passing through the torus of the double clutch.

If the windings of the electric machine are arranged, for example in the oil space or wet space of the transmission housing, they can be affected by splashed oil or pressure medium. To prevent this, according to the invention a splash baffle or the like, for example, can be provided, preferably having a labyrinth seal or similar between the electric machine and the transmission oil sump in the transmission housing. If, for example, a wet-running electric machine is used as the electric machine, this splash baffle can even be omitted and the oil or pressure medium ejected out of the separator clutch can be used for cooling the windings of the electric machine.

In the proposed integrated design of the separator clutch and double clutch, the oil or pressure medium of the separator clutch advantageously bypasses the torus of the double clutch so that the oil or pressure medium provision of the disk clutches of the double-clutch transmission is not influenced adversely.

In that, with the hybrid drive arrangement proposed, for example, the piston in a piston space for actuating the separator clutch and a baffle plate in a centrifugal force compensation space with the rotor of the electric machine are connected to one another, via the outer disk carrier of the separator clutch, the piston and the baffle plate rotate at the same speed as the electric machine. Consequently it is ensured that the centrifugal force compensation space always remains filled during the electric driving and coasting operating modes, in which the separator clutch is disengaged. This results in a short reaction time and positive control of the clutch engaging process when the internal combustion engine is to be started. Thus, the internal combustion engine can be restarted without any time lag.

In the version of the hybrid drive arrangement proposed according to the invention, only one radial shaft sealing ring, for sealing toward the outside, is needed because of the integrated design of the hybrid module.

Another possible embodiment variant of the invention can provide that a bearing cover or the like in the transmission housing is designed so that it separates or divides the wet space, in which the combination of the separator clutch and double clutch is accommodated, from a dry space for the electric machine. This enables a dry-running electric machine to be used. The said bearing cover can be made as one piece or with more than one component. Owing to this division of the transmission housing by the bearing cover a further shaft sealing ring may be needed, which is preferably in the form of a co-rotating sealing ring. It is advantageous if the sealing ring is designed to seal outwardly. In that case, the sealing ring can be fitted fixed on the drive input shaft connected to the crankshaft. When the vehicle is driven electrically, the sealing ring is static and seals dynamically in the bore of the shaft stump connected to the outer disk carrier combination of the two clutches. However, the shaft sealing ring can also be in the form of an inward-sealing shaft sealing ring.

A related possible embodiment variant of the invention can provide other bearing designs for the above embodiment variant in which, for example, the inner disk carrier of the separator clutch is mounted with at least one radial bearing and a plurality of axial bearings.

Regardless of the respective embodiment variants, in the proposed hybrid drive arrangement it can be provided that the internal combustion engine is coupled to the double-clutch transmission, via a suitable torsion damper, in order to damp rotation oscillations.

BRIEF DESCRIPTION OF THE DRAWINGS

Below, the present invention is explained further with reference to the drawings, in which examples of various embodiment variants of the invention are illustrated and which, individually, show.

DETAILED DESCRIPTION OF THE PREFERRED EMBODIMENTS

The figures represent various embodiment variants of a hybrid drive arrangement according to the invention for a vehicle. Regardless of the respective embodiment variants, the hybrid drive arrangement comprises an internal combustion engine for driving, under engine power and at least one electric machine 1, for electric driving, as well as a double-clutch transmission with a double clutch 2. The electric machine 1 can be separated from the internal combustion engine by a wet-operating, hydraulically actuated separator clutch 3.

According to the invention, it is provided that the outer disk carrier 4 of the separator clutch 3 and the outer disk carriers 5, 5A of the double clutch 2 of the double-clutch transmission, made as disk clutches, are connected and mounted together on the transmission housing 6. In this way, an outer disk carrier combination of the separator clutch and the double clutch is formed as a highly integrated system.

Figure 1:
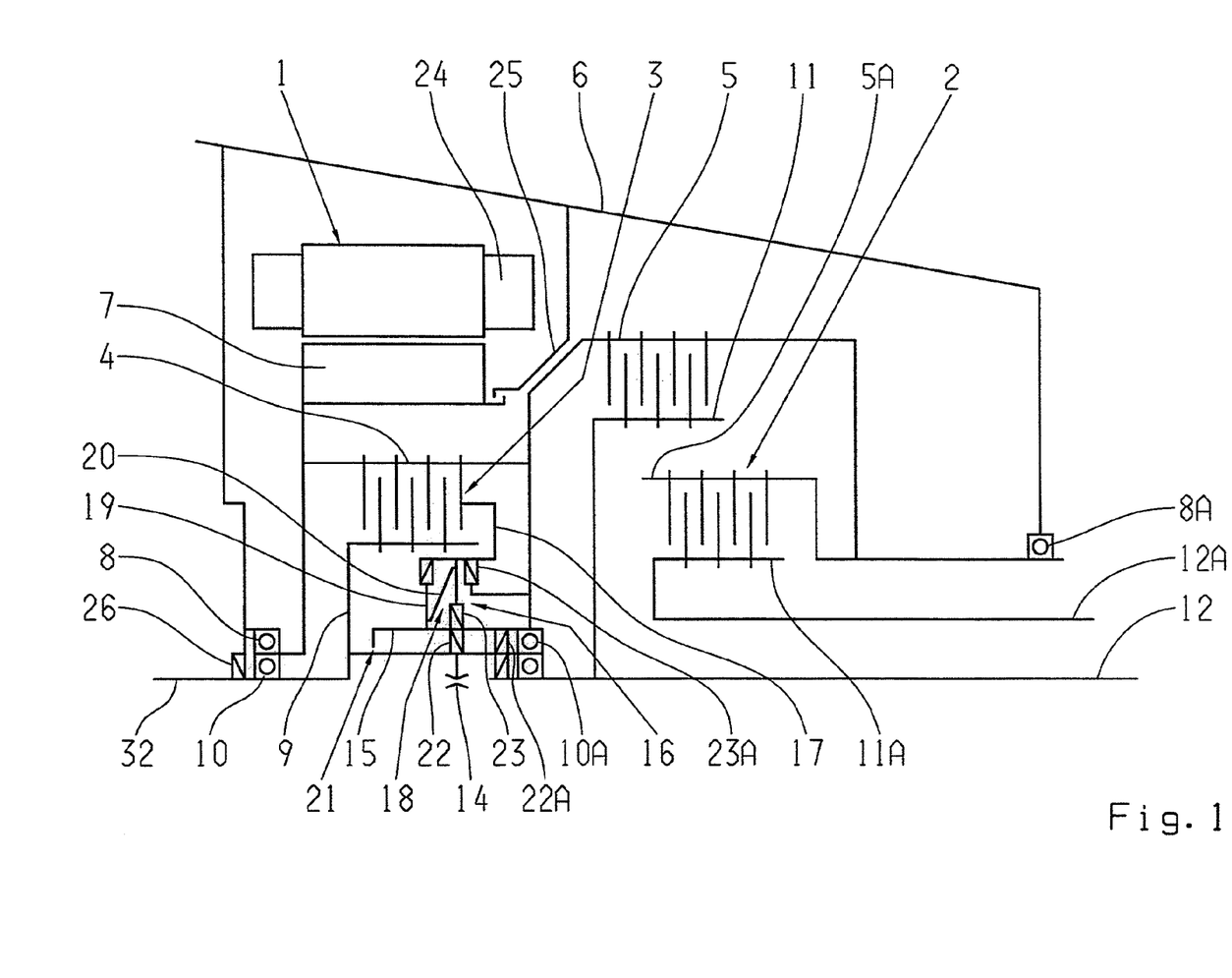
FIG. 1: A schematic view of a first possible embodiment variant of a hybrid drive arrangement, according to the invention, with an integrated clutch combination of the separator clutch and the double clutch.

According to FIG. 1, the outer disk carrier combination of the outer disk carrier 4 of the separator clutch 3 and the two outer disk carriers 5, 5A of the double clutch 2 are made integrally and mounted on both sides in the transmission housing 6. The rotor 7 of the electric machine 1 is fixed to the outer disk carrier 4 of the separator clutch 3. Consequently, the mountings 8, 8A of the outer disk carrier combination also serve as the mounting for the electric machine 1. The inner disk carrier 9 of the separator clutch 3 is mounted axially and radially on both sides by means of bearing points 10, 10A, indirectly on the transmission housing 6 via the mountings 8, 8A of the outer disk carrier combination. The inner disk carriers 11, 11A of the double clutch 2 are coupled to the associated input shafts 12, 12A of the respective part-transmissions of the double-clutch transmission.

Figure 5:
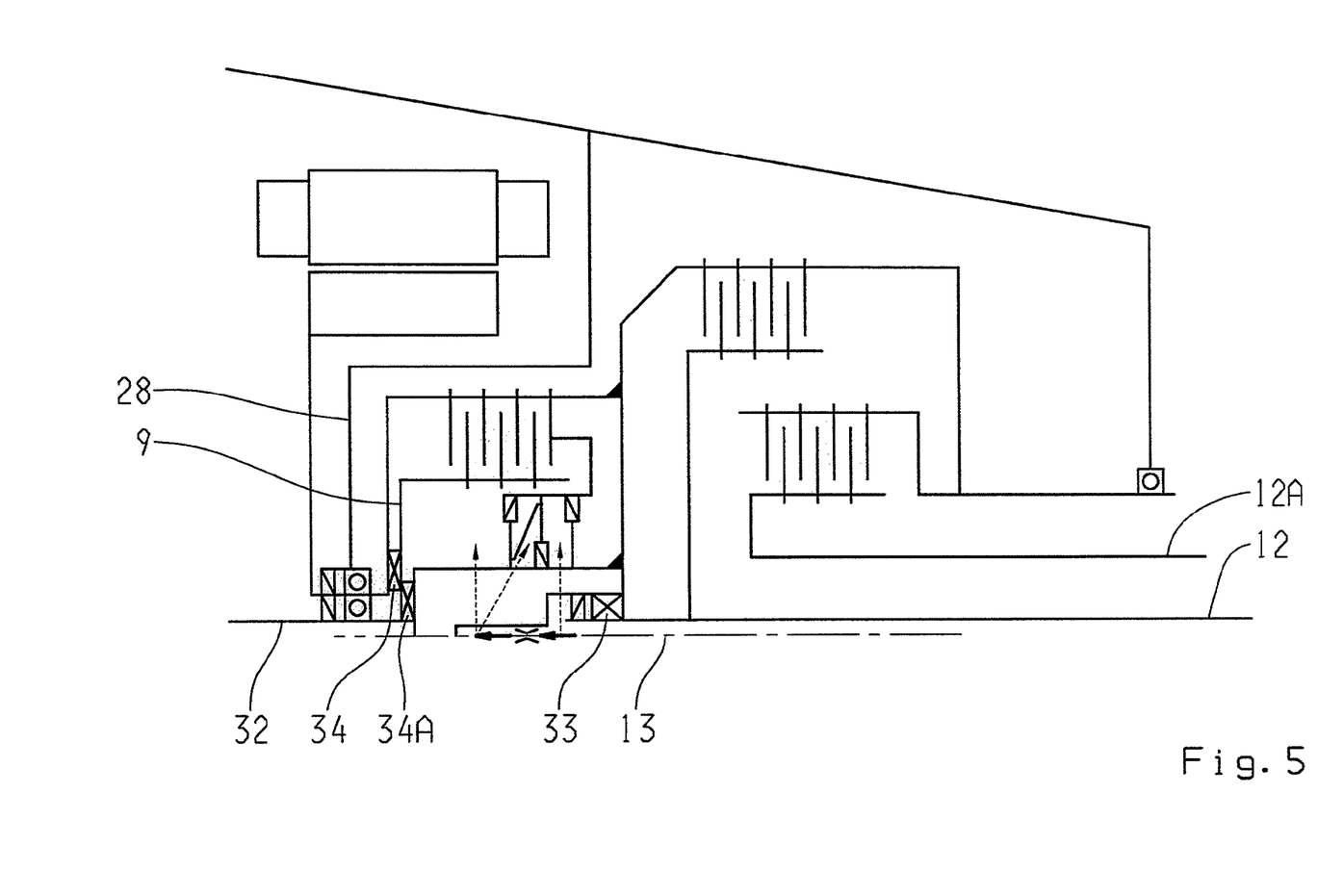
Figure 6:
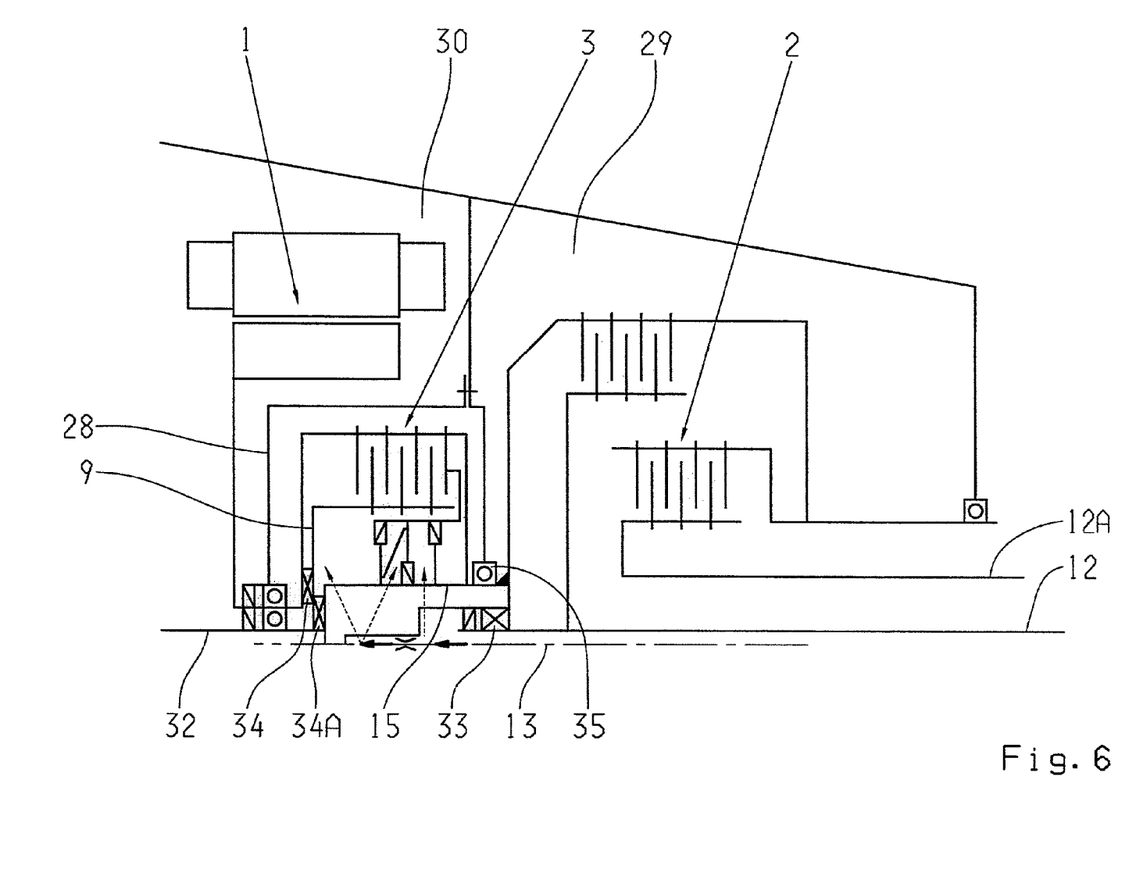
FIG. 6: A schematic view of a design alternative to that of FIG. 5

For supplying pressure medium and oil for cooling and actuating the separator clutch 3, a bore 13, only schematically indicated in FIGS. 5 and 6, is provided in the input shaft 12 of the double-clutch transmission. By means of an adjustable diaphragm 14 in a shaft 15 of the inner disk carrier 9 of the separator clutch 3 with seals 22, 22A to transmit the rotation, the oil flow is divided into an actuating oil quantity and a cooling oil quantity. The respective oil flows are then passed to the piston space 16 for actuating the piston 17 of the separator clutch 3 against the force of a restoring spring 20, and to a centrifugal force compensating space 18 in which a baffle plate 19 is provided. The piston space 16 is fitted with piston seals 23, 23A. Excess oil flows, via an annular gap 21 of a small diameter, as cooling oil into the inner disk carrier 9 of the separator clutch 3 and through bores (not shown) to the disk packet of the separator clutch 3. Then the cooling oil is pumped through the disk packet, by the pumping action of the rotating clutch disks of the separator clutch 3, and passes back into the transmission oil sump via bores (also not shown) in the outer disk carrier 4 of the separator clutch 3.

So that the windings 24 of the electric machine 1, which are also in the oil space or wet space 29 of the transmission housing 6, will not be affected directly by splashed oil, a splash baffle 25 with a labyrinth seal is provided between the electric machine 1 and the transmission oil sump. The hybrid module is sealed, on the outside, by a radial shaft sealing ring 26.

Figure 2:
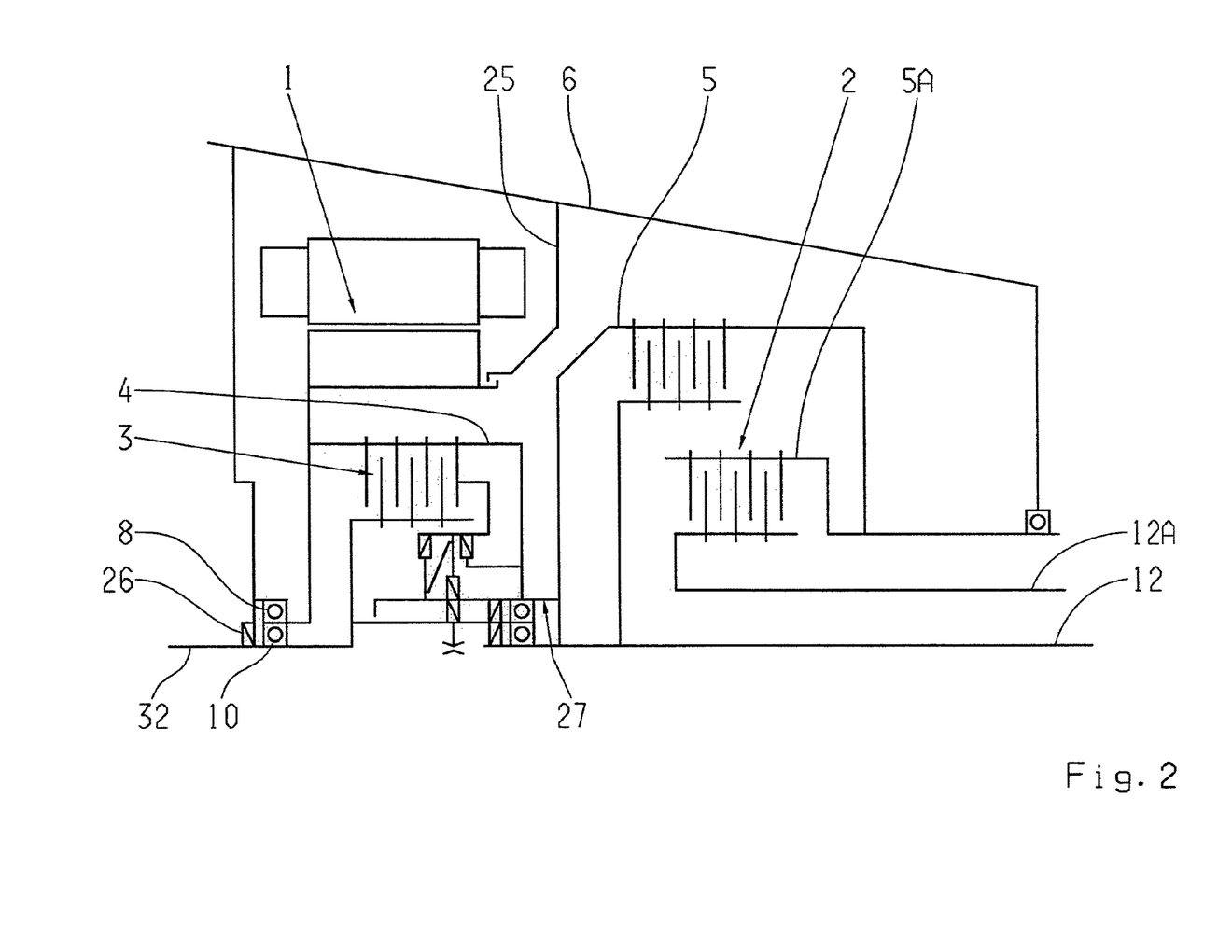
FIG. 2: A schematic view of a second embodiment variant of the hybrid drive arrangement, with a multi-component clutch combination.

FIG. 2 shows a second embodiment variation of the hybrid drive arrangement according to the invention in which, in contrast to the first embodiment variant, the outer disk carrier combination of the separator clutch 3 and the double clutch 2 is made as two parts. This means that the outer disk carrier 4 of the separator clutch 3 is connected to the outer disk carriers 5, 5A by a play-free, releasable connection 27. In this way, the hybrid module can be combined with existing double clutches without difficulty, so to speak, as an assembly of standardized units.

Figure 3:
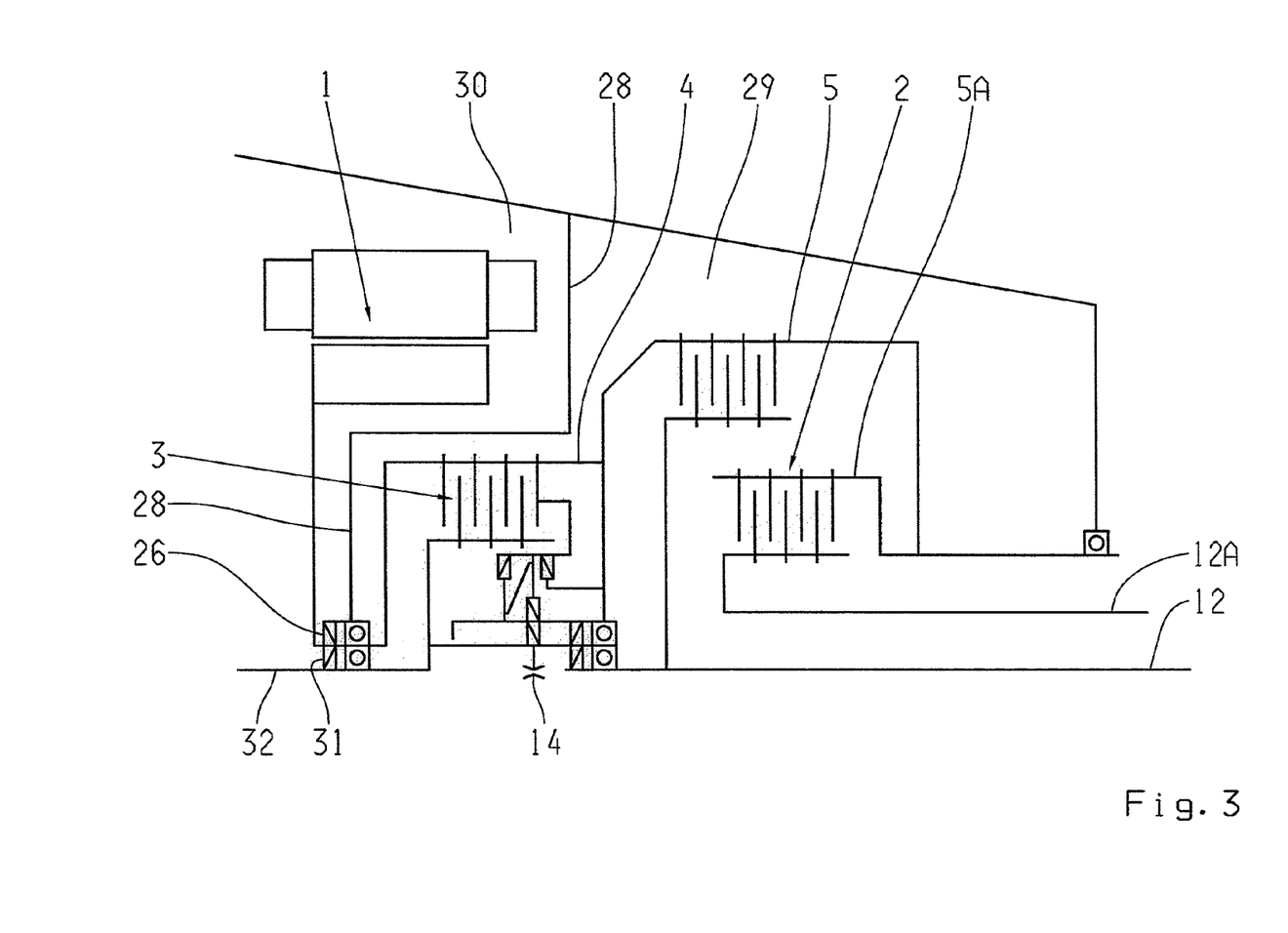
FIG. 3: A schematic view of a third embodiment variant of the hybrid drive arrangement, with a bearing cover for separating off a dry space for the electric machine.

FIG. 3 shows a third embodiment variant of the hybrid drive arrangement according to the invention in which, by virtue of a special design of the bearing cover 28, the wet space 29, in which the clutch combination is accommodated, is separated or divided from a dry space 30. The said dry space 30 holds the electric machine 1 which, in this special variant, can therefore also be dry-running. A co-rotating shaft sealing ring 31, which is mounted rotationally fixed on the driveshaft 32 connected to the crankshaft of the internal combustion engine, is provided for sealing. The sealing ring 31 is made as an outward-sealing shaft sealing ring. During electric driving, it is static and seals dynamically in the bore of the shaft stump connected to the outer disk carrier combination.

Figure 4:
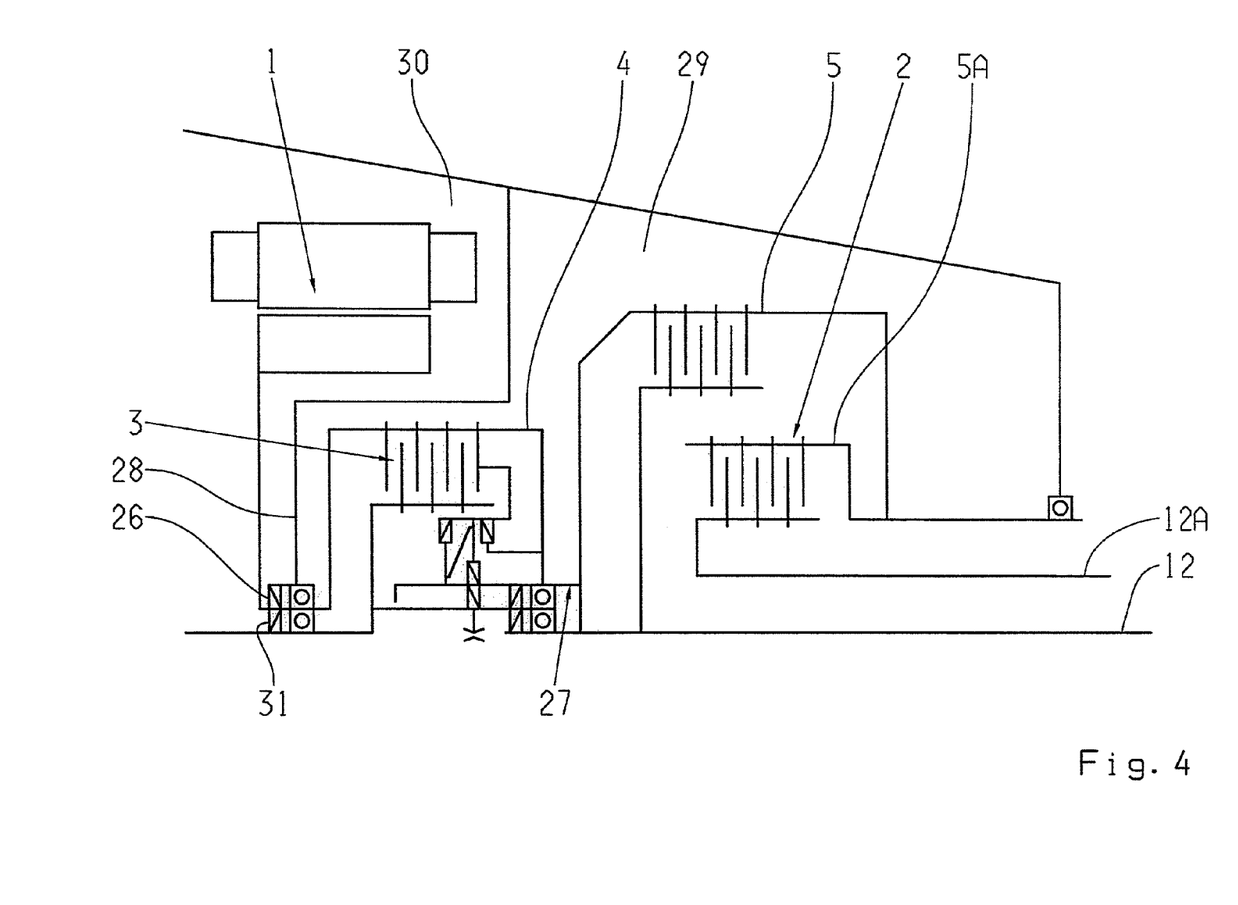
FIG. 4: A schematic view of a design alternative to that of FIG. 3, FIG. 5: A schematic view of a fourth embodiment variant of the hybrid drive arrangement, with an alternative bearing design.

The alternative embodiment variant shown in FIG. 4 differs from the one shown in FIG. 3 only in that the outer disk carrier 4 of the separator clutch 3 is connected to the outer disk carriers 5, 5A of the double clutch 2 by the releasable connection 27.

FIG. 5 shows a fourth embodiment variant of the hybrid drive arrangement, according to the invention, in which an alternative bearing design is provided in particular for the above embodiment variants. In this alternative bearing design, the inner disk carrier 9 of the separator clutch 3 is mounted by a radial bearing 33 and two axial bearings 34, 34A.

The alternative design shown in FIG. 6 differs from the embodiment variant shown in FIG. 5, only in that the bearing cover 28 is formed by more than one component and is supported on the shaft 15 of the inner disk carrier 9 of the separator clutch 3 by an additional bearing point 35.

INDEXES

1 Electric machine
2 Double clutch
3 Separator clutch
4 Outer disk carrier of the separator clutch
5, 5A Outer disk carriers of the double clutch
6 Transmission housing
7 Rotor of the electric machine
8, 8A Mountings of the outer disk carrier combination
9 Inner disk carrier of the separator clutch
10, 10A Bearing points of the inner disk carrier
11, 11A Inner disk carriers of the double clutch
12, 12A Input shafts of the part-transmissions
13 Bore for pressure medium supply
14 Adjustable diaphragm
15 Shaft of the inner disk carrier
16 Piston space
17 Piston
18 Centrifugal force compensation space
19 Baffle plate
20 Restoring spring
21 Annular gap
22, 22A Seal for rotation transmission
23, 23A Piston seal
24 Windings of the electric machine
25 Splash baffle
26 Radial shaft seal
27 Releasable connection
28 Bearing cover
29 Wet space
30 Dry space
31 Shaft seal
32 Driveshaft
33 Radial bearing
34, 34A Axial bearings
35 Bearing point for the bearing cover

The invention claimed is:

1. A hybrid drive arrangement for a vehicle comprising an internal combustion engine for driving, under engine power, and at least one electric machine (1) for electric driving, and comprising a double-clutch transmission having double clutches and at least one separator clutch, in a form of a wet-operating, hydraulically actuated disk clutch, for separating the electric machine (1) from the internal combustion engine,
wherein an outer disk carrier (4) of the separator clutch (3) and outer disk carriers (5, 5A) of the two double clutches of the double-clutch transmission are connected together and mounted on the transmission housing (6).

2. The hybrid drive arrangement according to claim 1, wherein the outer disk carrier (4) of the separator clutch (3) and the outer disk carriers (5, 5A) of the double clutch (2) of the double-clutch transmission are connected together by at least one releasable connection (27).

3. The hybrid drive arrangement according to claim 1, wherein the outer disk carrier (4) of the separator clutch (3) and the outer disk carriers (5, 5A) of the double clutches (2) of the double-clutch transmission are made as one integral component.

4. The hybrid drive arrangement according to claim 1, wherein the outer disk carrier (4) of the separator clutch (3) is connected to a rotor (7) of the electric machine (1).

5. The hybrid drive arrangement according to claim 1, wherein mounting (8, 8A) of the outer disk carrier of the separator clutch (3) to the housing are provided as a bearing of the electric machine (1).

6. The hybrid drive arrangement according to claim 1, wherein the inner disk carrier (9) of the separator clutch (3) is mounted indirectly to the housing by at least bearing (8) of the outer disk carrier (4) of the separator clutch (3).

7. The hybrid drive arrangement according to claim 1, wherein the inner disk carriers (11, 11A) of the double clutches (2) are each respectively coupled to a first and a second input shaft (12, 12A) of the double-clutch transmission.

8. The hybrid drive arrangement according to claim 7, wherein at least one bore (13) is provided within the input shaft (12) of the first part-transmission of the double-clutch transmission, as a pressure medium inlet for actuating and cooling at least the separator clutch (3).

9. The hybrid drive arrangement according to claim 8, wherein an adjustable diaphragm (14) is provided, in a shaft (15) of the inner disk carrier (9) of the separator clutch (3), for dividing a quantity of pressure medium supplied by the bore (13) into a first flow for cooling the separator clutch (3) and a second flow for actuating the separator clutch (3).

10. The hybrid drive arrangement according to claim 1, wherein a splash baffle (25) is provided in the transmission housing (6) between the electric machine (1) and a transmission sump.

11. The hybrid drive arrangement according to claim 1, wherein a piston (17), for actuating the separator clutch (3), and a baffle plate (19), located in a centrifugal force compensation space (18), are connected to the rotor (7) of the electric machine (1) via the outer disk carrier (4) of the separator clutch (3).

12. The hybrid drive arrangement according to claim 1, wherein the hybrid module with the electric machine (1) and the separator clutch (3) is sealed by at least one radial shaft sealing ring (26).

13. They hybrid drive arrangement according to claim 1, wherein a wet space (29) of the separator clutch (3) and the double clutch (2) of the double-clutch transmission is separated from a dry space (30) for the electric machine (1) by a bearing cover (28) of the transmission housing (6).

14. The hybrid drive arrangement according to claim 13, wherein the bearing cover (28) is supported by at least one bearing point (35) on the shaft (15) of the inner disk carrier (9) of the separator clutch (3).

15. The hybrid drive arrangement according to claim 13, wherein a co-rotating shaft sealing ring (31) is provided, which is connected rotationally fixed on the driveshaft (32).

16. The hybrid drive arrangement according to claim 1, wherein the inner disk carrier (9) of the separator clutch (3) is mounted by at least one radial bearing (33) and at least two axial bearings (34, 34A).

* * * * *